United States Patent [19]
Sato

[11] Patent Number: 5,745,306
[45] Date of Patent: Apr. 28, 1998

[54] INTERNAL FOCUSING TELEPHOTO LENS

[75] Inventor: Susumu Sato, Chiba-ken, Japan

[73] Assignee: Nikon Corporation, Tokyo, Japan

[21] Appl. No.: 634,032

[22] Filed: Apr. 17, 1996

[30] Foreign Application Priority Data

May 26, 1995 [JP] Japan .................................. 7-152709

[51] Int. Cl.[6] ........................... G02B 13/02; G02B 27/64
[52] U.S. Cl. .......................... 359/745; 359/748; 359/557
[58] Field of Search ................................ 359/745, 746, 359/747, 748, 557

[56] References Cited

U.S. PATENT DOCUMENTS

| | | | |
|---|---|---|---|
| 4,978,205 | 12/1990 | Sato | 359/557 |
| 5,323,270 | 6/1994 | Sato | 359/745 |
| 5,438,455 | 8/1995 | Nakatsuji et al. | 359/745 |
| 5,490,014 | 2/1996 | Suzuki | 359/746 |
| 5,610,769 | 3/1997 | Shoji | 359/745 |

*Primary Examiner*—Scott J. Sugarman
*Attorney, Agent, or Firm*—Oliff & Berridge, PLC

[57] ABSTRACT

The internal focusing telephoto lens of the invention has a focusing group with a small effective diameter and small focusing movement amount and maintains favorable optical performance. The internal focusing telephoto lens of the invention includes, in the following order from the object side; a first lens group that has a positive refractive power, a second lens group that has negative refractive power, and a third lens group that has a positive refractive power. The first and second lens groups form a substantially afocal system and focusing is performed by moving the second lens group along the optical axis. The first lens group includes, in the following order from the object side, a front group that has a positive refractive power and a rear group, which has about the same positive refractive power as the front group, and satisfies specified conditions.

25 Claims, 15 Drawing Sheets

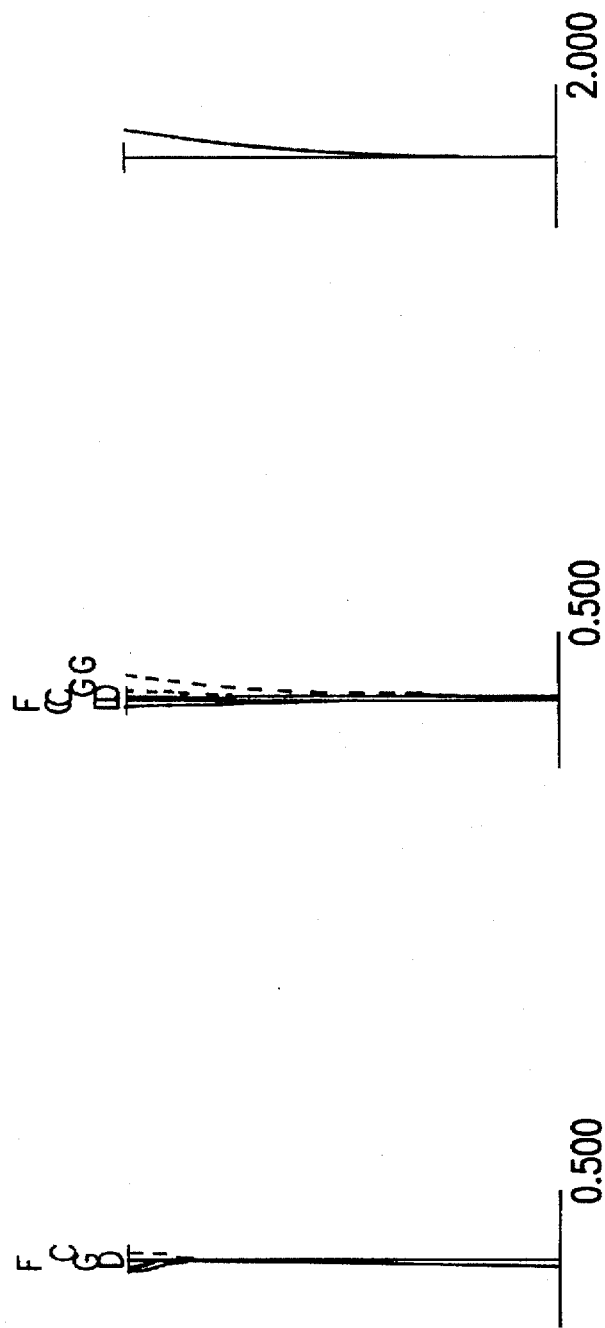

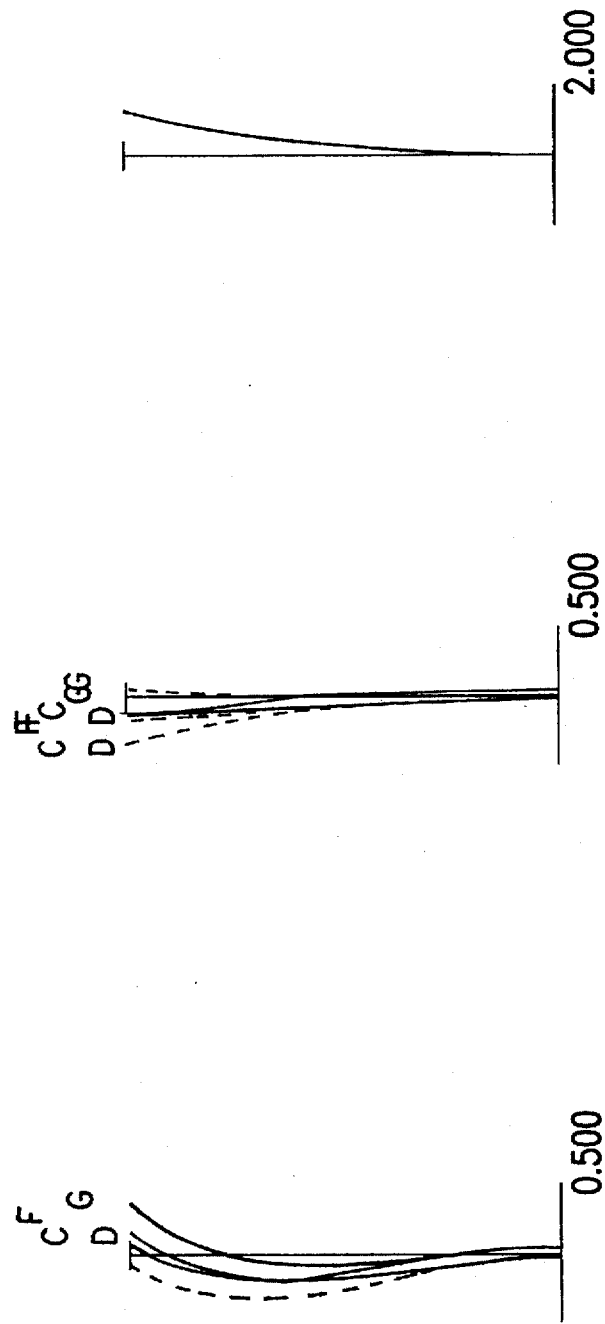

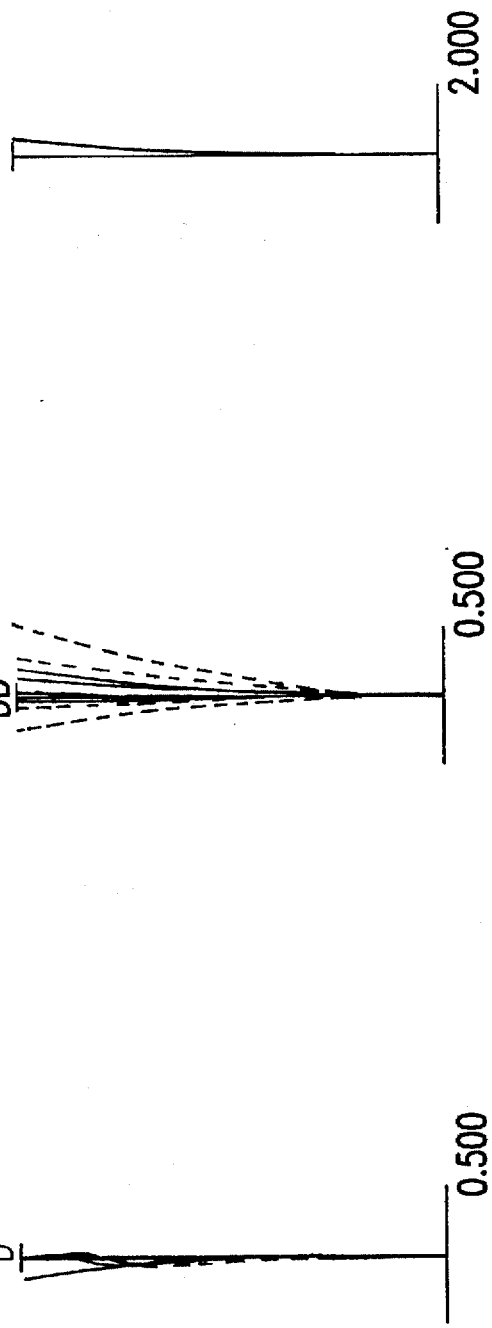

INTERNAL FOCUSING TELEPHOTO LENS

BACKGROUND OF THE INVENTION

1. Field of the Invention

The present invention relates to an internal focusing telephoto lens, more particularly, to an internal focusing telephoto lens best suited for a single lens reflex camera or an electronic still camera.

2. Description of Related Art

In telephoto lenses used in conventional single lens reflex cameras and conventional electronic still cameras, the focusing lens that moves along the optical axis during focusing has a large effective diameter. The distance that the focusing lens group travels during focusing (or the focusing movement amount) is also large.

In the present specification, "vibration correction" is implemented to correct change in image position caused by focusing operation and hand shaking. Vibration correction is achieved by decentering certain lens groups with respect to the optical axis.

As described above, in conventional telephoto lenses, the effective diameter of the focusing lens group is large. Therefore, driving hardware for focusing concentrate in the radial direction. Moreover, when shooting with high magnification, the focusing movement amount becomes very large. As a result, the focusing mechanism and the load on the auto focus drive motor become large.

SUMMARY OF THE INVENTION

In view of the problems described above, the invention aims to provide an internal focusing telephoto lens that has a focusing lens group with a small effective diameter and a small focusing movement amount while maintaining favorable optical capabilities.

The internal focusing telephoto lens of this invention includes in the following order from the object side: a first lens group with positive refractive power; a second lens group with negative refractive power; and a third lens group with positive refractive power. The first lens group and the second lens group form a substantially afocal system and focusing is performed by moving the second lens group along the optical axis. The first lens group includes, in the following order from the object side, a front lens group that has positive refractive power and a rear group that has about the same positive refractive power as the front group. The following conditions $$0.7 < |f1 \times f3/(f2 \times F)| < 1.3 \quad (1)$$

$$0.24 < |f2|/f1 < 0.41 \quad (2)$$

$$0.7 < f11/f12 < 1.4 \quad (3)$$

are satisfied, where f1 is the focal length of the first lens group, f2 is the focal length of the second lens group, f3 is the focal length of the third lens group, f11 is the focal length of the front lens group in the first lens group, f12 is the focal length of the rear group in the first lens group, and F is the focal length of the total lens system.

According to a preferred embodiment of the present invention, the front lens group in the first lens group includes, in the following order from the object side, a first positive lens element, a second positive lens element L12, and a negative lens element. The following conditions:

$$va < 48 \quad (4)$$

$$-0.46 < (Rb-Ra)/(Rb+Ra) \leq 0 \quad (5)$$

are satisfied, where Ra is the radius of curvature of the image side surface of the first positive lens element, Rb is the radius of curvature of the object side surface of the second negative lens element and va is the Abbe number of the second negative lens element.

A telephoto lens of the present invention includes three groups of positive, negative, and positive refractive power, respectively, and has a basic structure in which the light rays are converged by the first lens group and focusing is performed by moving the second lens group that has negative refractive power. In this focusing method, the second lens group is moved along the optical axis so that it is always focused in the neighborhood of the image point of the object composed by the first lens group. Hence, light rays incident on the third lens group are always substantially parallel to the optical axis and the image point of the total optical system is constant.

Thus, the movement amount of a thick lens system can be unconditionally determined by considering the refractive power arrangement of the thin lens system. In order to achieve the minimization of focusing movement of the second lens group, which has negative refractive power, it is sufficient to minimize the movement of image point with respect to the movement of the object point caused by the first lens group.

A condition (A) is established, $$1/a + 1/b = 1/f1 \quad (A)$$

in which, f1 is the focal length of the first lens group when the first lens group is evaluated as a thin lens, "a" is the object point distance, and "b" is the image point distance.

By manipulating the formula (A), formula (B) is obtained.

$$f1 = a/(a/b+1) \quad (B)$$

The vertical magnification a is expressed by formula (C) below.

$$\alpha = (-b/a)^2 = b^2/a^2 \quad (C)$$

Solving (C) for b, the formula (D) below is obtained.

$$b = a\alpha^{1/2} > 0 \quad (D)$$

Here, during focusing, the object point distance a changes due to movement of object point from a specific position. However, if focusing is achieved with a certain object point distance "a", that is, if the object point distance "a" is constant, it is sufficient to minimize the vertical magnification a so as to minimize the movement amount of the second lens group. The movement amount of the second lens group is the movement amount of the image point with respect to the movement amount of the object point.

By substituting formula (D) into formula (B), the formula (E) below is obtained.

$$f1 = a/(1/\alpha^{1/2} + 1) \quad (E)$$

Formula (E) shows that the focal length f1 becomes small with the vertical magnification α. Therefore, focusing movement amount can be minimized by minimizing the focal length f1 of the first lens group.

Because the first lens group and the second lens group form a substantially a focal system, the focal length f3 of the third lens group becomes constant and the formula (F) below is established:

$$f1/f2 = \text{constant} \tag{F}$$

where f2 is the focal length of the second lens group G2 considering the second lens group G2 as a thin lens.

The formula (F) shows that the focal length f2 of the second lens group becomes necessarily small with the focal length f1 of the first lens group. However, if the combined refractive power of the first lens group and the second lens group is too strong, aberration of the overall optical system worsens, although shortening of total length of the lens system is achieved.

Based on the above observation, the invention minimizes the effective diameter of the second lens group, which is a focusing lens group, and creates conditions to obtain favorable optical capability (aberration characteristics).

BRIEF DESCRIPTION OF THE DRAWINGS

FIGS. 2(a)–2(f) show various aberrations in an infinite focusing state in the embodiment of FIG. 1;

FIGS. 3(a)–3(f) show various aberrations in a close distance focusing state in the embodiment of FIG. 1;

FIGS. 8(a)–8(e) show various aberrations in an infinite focusing state in the third embodiment of FIG. 7;

DETAILED DESCRIPTION OF PREFERRED EMBODIMENTS

Hereafter, the embodiments of the present invention will be described with reference to attached drawings.

Figure 1:
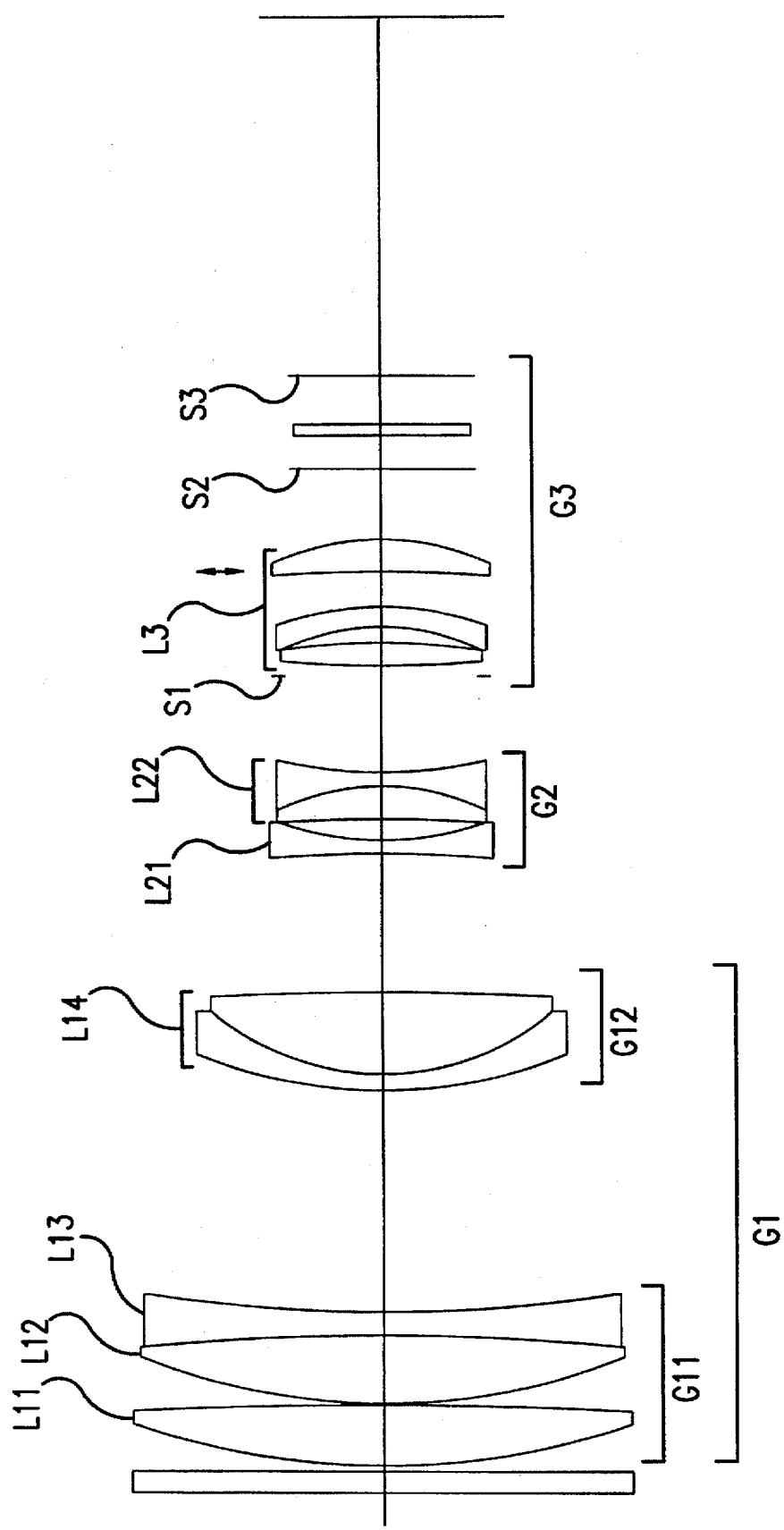
FIG. 1 shows a structure of an internal focusing telephoto lens of a first embodiment of the invention.
Figure 4:
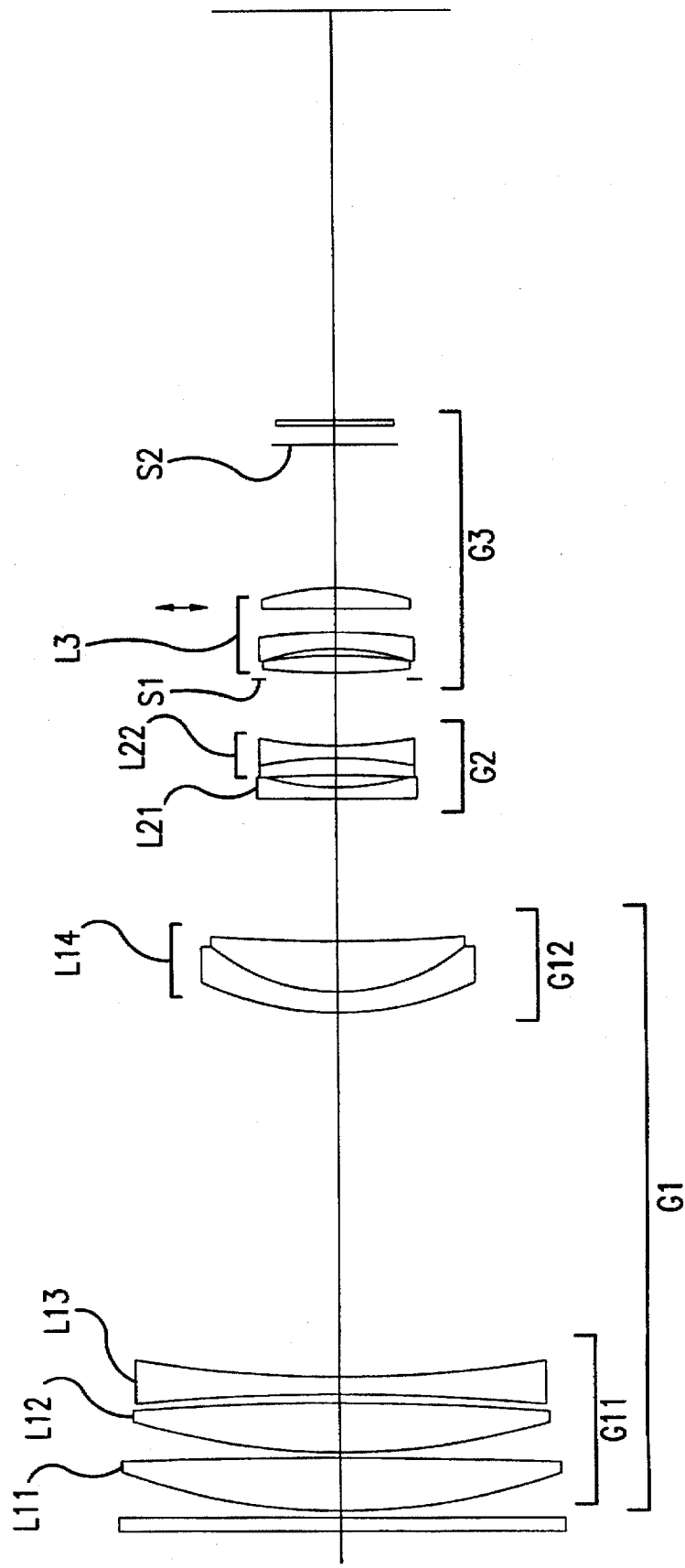
FIG. 4 shows a structure of an internal focusing telephoto lens of a second embodiment of the invention.
Figure 7:
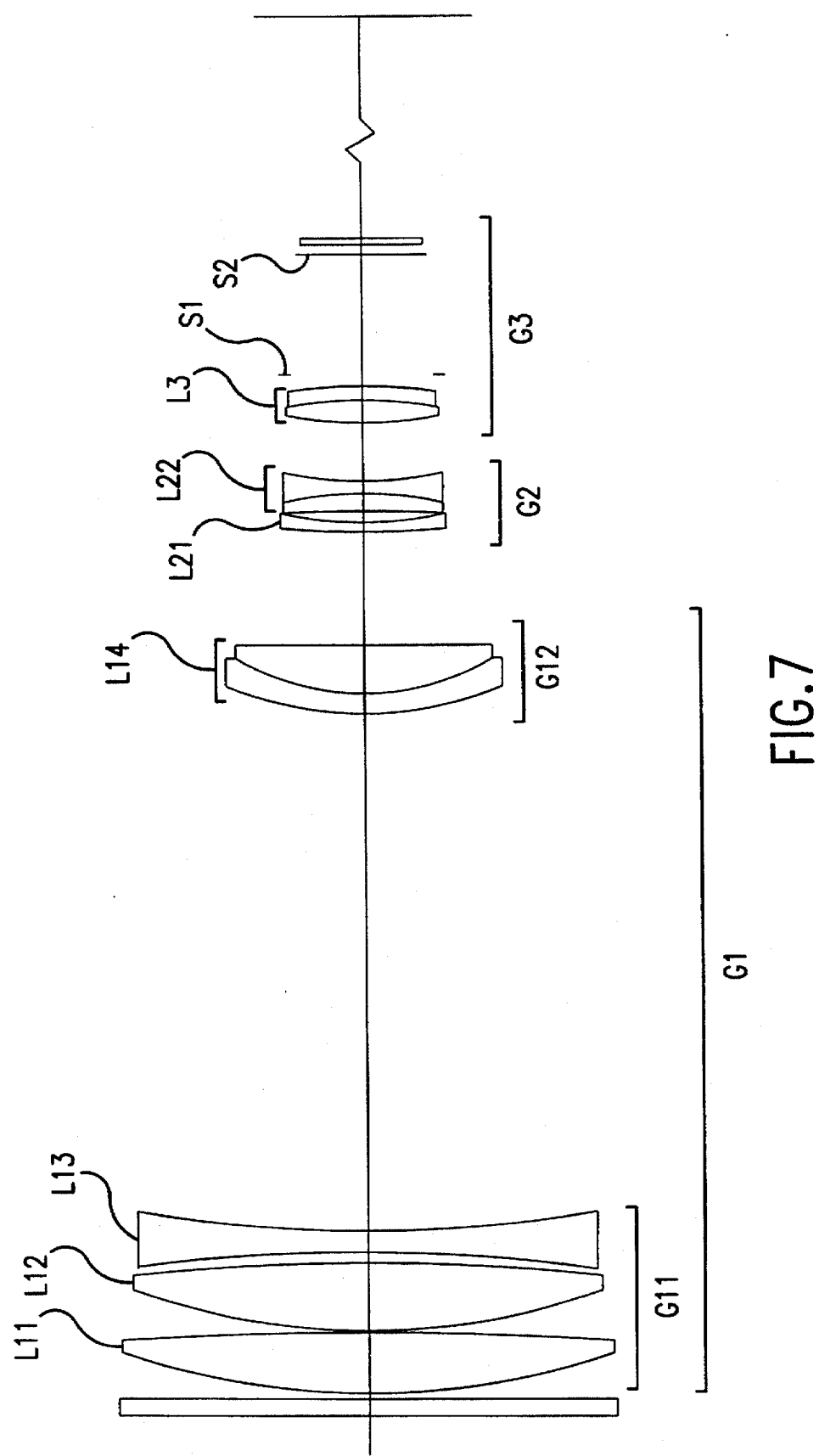
FIG. 7 shows a structure of an internal focusing telephoto lens of a third embodiment of the present invention.

In each embodiment as shown in FIGS. 1, 4, and 7, an internal focusing telephoto lens of the present invention includes, in the following order from the object side: a first lens group G1 that has a positive refractive power; a second lens group G2 that has negative refractive power; and a third lens group G3 that has a positive refractive power. The first lens group G1 and the second lens group G2 form a substantially afocal system and focusing is performed by moving the second lens group G2 along the optical axis. The first lens group G1 includes, in the following order from the object side, a front group G11, which has a positive refractive power and a rear group G12, which has approximately the same positive refractive power as the front group G11. Each of the aforementioned lens groups may include one or more lenses.

Moreover, in each embodiment, the first lens group G1 has a front group G11 including, in the following order from the object side, a biconcave positive lens L11, a positive lens L12 having a surface with stronger curvature facing the object side, and a biconcave lens L13, and a rear group G12 including a positive lens element L14.

Also, in each embodiment, the second lens group G2 includes, in the following order from object side, a first negative lens element L21 of the second lens group and a second cemented negative lens L22, which has a positive lens having its surface with a stronger curvature facing the image side and a biconcave shape negative lens.

Hereafter, each condition of the invention will be described.

In the telephoto lens of the present invention, the first lens group G1 includes, in the following order from the object side, the front lens group G11, which has positive refractive power, and the rear group G12, which has approximately the same positive refractive power as the front lens group G11. The system satisfies the formulae (1) through (3) below.

$$0.7 < |f1 \times f3/(f2 \times F)| < 1.3 \tag{1}$$

$$0.24 < |f2|/f1 < 0.41 \tag{2}$$

$$0.7 < f11/f12 < 1.4 \tag{3}$$

Here, f1: focal length of the first lens group G1;
f2: focal length of the second lens group G2;
f3: focal length of the third lens group G3;
f11: focal length of the front lens group G11 in the first lens group G1;
f12: focal length of the rear group G12 in the first lens group G1; and
F: focal length of total lens system.

Condition (1) defines a proper range for afocal level of the afocal system formed by the first lens group G1 and the second lens group G2.

If the lower limit and the upper limit of condition (1) are violated, the combined refractive power of the first lens group G1 and the second lens group G2 becomes too strong, causing undesirably large fluctuation in spherical aberration by close-distance focusing.

Condition (2) defines a proper range for the ratio of the refractive power of the first lens group G1 and the refractive power of the second lens group G2.

When |f2|/f1 is larger than the upper limit of condition (2), the effective diameter of the second lens group G2, which is a focusing lens group, becomes too large and fails to achieve the object of the present invention.

On the contrary, when |f2|/f1 is smaller than the lower limit of the condition (2), fluctuation of spherical aberration by close-distance focusing becomes undesirably large. Moreover, lower coma aberration for g-line ($\lambda$=435.6 nm) becomes undesirably large in the negative direction.

Condition (3) establishes a guide for balancing between shortening of the total length of the optical system and favorable imaging performance. Condition (3) also defines a proper range for the ratio of refractive power of the front lens group G11 and the refractive power of the rear group G12 in the first lens group G1.

When f11/f12 is larger than the upper limit of condition (3), the total length of the optical system becomes undesirably large.

However, if f11/f12 is smaller than the lower limit of condition (3), the fluctuation of spherical aberration during close-distance focusing becomes undesirably large. Moreover, lower coma aberration of the g-line becomes undesirably large in the negative direction.

Even better balancing between shortening of total length of the optical system and favorable imaging performance is obtained by increasing the lower limit to 0.8 and decreasing the upper limit to 1.3 in condition (3).

In the present invention, the front lens group G11 of the first lens group G1 preferably includes, in the following order from the object side, positive lens element L11, positive lens element L12, and negative lens element L13. The following conditions $$va < 48 \quad (4)$$

$$-0.46 < (Rb-Ra)/(Rb+Ra) \leq 0 \quad (5)$$

are satisfied.

Here, va: the Abbe number of negative lens element L13;

Ra: the radius of curvature of the image side surface of said positive lens element L12; and Rb: the radius of curvature of the object side surface of said negative lens element L13.

Condition (4) is aimed at maintaining favorable second order chromatic aberration.

When va is larger than the upper limit in condition (4), it becomes difficult to maintain favorable second order chromatic aberration throughout the image circle. For this reason, such large va is not preferable.

Condition (5) is directed toward obtaining favorable imaging performance.

When (Rb–Ra)/(Rb+Ra) is larger than the upper limit of condition (5), correction of spherical aberration is insufficient. Therefore, such large (Rb–Ra)/(Rb+Ra) is not preferable.

However, when (Rb–Ra)/(Rb+Ra) is smaller than the lower limit of condition (5), spherical aberration becomes too large in the positive direction and the spherical aberration of the g-line generated at the first lens group G1 bends further in the positive direction, making it difficult to correct the aberration. Hence fluctuation of spherical aberration in chromatic aberration remains. For this reason, such small (Rb–Ra)/(Rb+Ra) is undesirable.

In order to make the fluctuation of spherical aberration in chromatic aberration even smaller, the lower limit of condition (5) may preferably be increased to –0.1.

In the present embodiment, the second lens group G2 includes at least, in the following order from the object side, first negative lens element L21 of the second lens group and second negative lens element L22 of the second lens group. The third lens group G3 includes a positive lens group L3. The following conditions:

$$0.35 < f1/F < 0.60 \quad (6)$$

$$0.7 < f22/f21 < 1.8 \quad (7)$$

$$-1.4 < (Rd+Rc)/(Rd-Rc) < -0.4 \quad (8)$$

are satisfied, where f21: the focal length of the first negative lens element L21 of the second lens group;

f22: the focal length of the second negative lens element L22 of the second lens group;

Rc: the radius of curvature of the object side surface of the negative lens element L21; and Rd: the radius of curvature of the image side surface of negative lens element L21 of the second lens group.

Condition (6) defines a proper range for the ratio of focal length f1 of the first lens group G1 and the focal length F of the total lens system.

When f1/F is larger than the upper limit of condition (6), the focal length f1 of the first lens group G1 becomes large, causing the total length of the optical system as well as the focusing movement amount to become undesirably large.

However, if f1/F is smaller than the lower limit of condition (6), the focal length f1 of the first lens group G1 becomes too small. As a result, correction of spherical aberration becomes insufficient even if the diameter of the first lens group G1 is increased without increasing the small number of lenses. Therefore, it becomes difficult to provide an optical system for which aberration is well corrected for a large aperture. At the same time, central thickness of the positive lens component needs to be increased, making the optical system undesirably heavier.

Condition (7) aims to secure favorable imaging performance from the infinite focusing condition to the extremely close-distance focusing condition and defines optimal power distribution between second negative lens element L22 of the second lens group and first negative lens element L21 in the second lens group G2, which is a focusing lens group.

If f22/f21 is smaller than the lower limit of condition (7), bow in spherical aberration becomes too large from positive to negative as the incident height changes from high to low. Therefore, the correction of the aberration becomes difficult.

However, if f22/f21 is larger than the upper limit, bow in the aberration becomes large from negative to positive as the incident height changes from high to low. This tendency is more noticeable with the change from infinite focusing condition to the extremely close-distance focusing condition and satisfactory focusing performance cannot be maintained.

Condition (8) defines a proper range for the shape factor of the negative lens element L21 in the second lens group G2.

If (Rd+Rc)/(Rd–Rc) is larger than the upper limit of condition (8), spherical aberration generated in the object side of the negative lens element L21 becomes too large in the positive direction, and bends sharply in the positive direction with increase in incident height. Therefore, correction of the aberration becomes difficult.

However, if (Rd+Rc)/(Rd–Rc) is smaller than the lower limit of condition (8), positive refractive power of the object side surface of the negative lens element L21 becomes small. Therefore, positive spherical aberration generated in the object side of the negative lens element L21 decreases too much and the balance with the spherical aberration possessed by other lenses is lost, causing a bow in the negative direction.

Because the second lens group G2 is a focusing lens group, it must be light-weight. To achieve this objective, the negative lens element L21 on the object side of the second lens group G2 is preferably composed of one negative lens.

Normally, in the second lens group G2, large positive spherical aberration can easily occur if first negative lens element L21 of the second lens group, which is on the object side and has a large effective diameter, is composed of one negative lens, but cannot easily occur if second negative lens element L22 on the image side is composed with one lens. However, by satisfying conditions (1)–(8), it becomes possible to compose negative lens element L21 of the second lens group with one lens by appropriately regulating the first lens group G1 and the second lens group G2. The lens groups generate spherical aberration in the negative direction at the first lens group G1. The spherical aberration is generated at the first lens system to offset the bow in the spherical aberration generated at the second lens group G2.

Moreover, in order to correct aberration even more favorably, the Abbe number vb of negative lens element L21 in the second lens group G2 preferably satisfies condition (9) below.

$$45 < \nu b \quad (9)$$

When νb is smaller than the lower limit of condition (9), chromatic aberration of magnification, and in particular, the chromatic aberration of magnification with respect to g-line, becomes large in the negative direction, and correction of aberration becomes difficult. For this reason, a small value of νb is not preferable.

Moreover, in order to correct aberration even more favorably, the negative lens element L22 in the second lens group G2 preferably includes a cemented lens which has, in the following order from the object side, a positive meniscus lens with a concave surface facing the object side and a biconcave lens. Conditions (10) and (11) below are satisfied.

$$0.1 < Nc - Nd < 0.35 \quad (10)$$

$$25 < \nu d - \nu c \quad (11)$$

Here,

Nc: refractive index of the positive meniscus lens of second negative lens element L22 of the second lens group;

νc: the Abbe number of the positive meniscus lens of second negative lens element L22 of the second lens group;

Nd: refractive index of the biconcave lens of second negative lens element L22 of the second lens group;

νd: the Abbe number of the biconcave lens of second negative lens element L22 of the second lens group; and Nc and Nd are the values for d-line ($\lambda$=587.6 nm).

Conditions (10) and (11) establish optimal conditions for refractive power of the achromatic surface in correcting spherical aberration for each wavelength.

When Nc–Nd is smaller than the lower limit in condition (10), the refractive power of the achromatic surface for the d-line becomes too weak to contribute to spherical aberration of the d-line and reasonable selection of the appropriate optical material or optical glass becomes impossible.

On the contrary, when Nc–Nd is larger than the upper limit of condition (10), the converging refractive power of the achromatic surface becomes strong and correction of spherical aberration becomes undesirably insufficient.

When νd–νc is smaller than the lower limit of condition (11), the radius of curvature of the achromatic surface to correct axial chromatic aberration and chromatic aberration of magnification becomes too small. As a result, correction of spherical aberration, especially short wavelength spherical aberration becomes insufficient.

These effects occur because of the first lens group G1. When the refractive power of the first lens group G1 becomes too strong, the spherical aberration of the first lens group G1 becomes too large in the negative direction and the aberration of total optical system worsens.

Hence, in order to minimize the focusing movement amount and to obtain favorable spherical aberration correction, the condition below should be satisfied.

$$0.55 < \Phi/f1 < 0.72 \quad (12)$$

Here, $\Phi$ is the effective diameter of the object side lens surface of the positive lens element L11 in the first lens group G1, which is positioned closest to the object side.

Condition (12), regulates the ratio of effective diameter $\Phi$ of the object side lens surface of the positive lens element L11, which is closest to the object side in the first lens group G1, to the focal length f1 of the first lens group G1.

When $\Phi$/f1 is larger than the upper limit of condition (12), the focal length f1 of the first lens group G1 becomes too small compared to its effective diameter. The spherical aberration of the first lens group G1 becomes too large in the negative direction with a high order of bow, making aberration correction difficult. The second order chromatic aberration also becomes large. In order to correct these aberrations, it becomes difficult to compose the first lens group G1 with a small number of lens pieces as in the case of the present invention.

When $\Phi$/f1 is smaller than the lower limit of condition (12), the focal length of the first lens group G1 becomes too large and the objects of the present invention cannot be achieved.

Moreover, the focal the length of first lens group G1 is very short in the present embodiment and spherical aberration tends to become large in the negative direction. Therefore, the first lens group G1 preferably includes, in the following order from the object side, positive lens element L11 that has a convex surface facing the object side, positive lens element L12 having biconvex shape, and negative lens element L13 having biconcave shape, as well as the front lens group G11 and the rear group G12.

The first lens group G1 should be structured as described above for several reasons. The shooting distance for obtaining a specific magnification in the optical system with a long focal length is longer than the shooting distance for obtaining the same magnification in the optical system with standard focal length. Hence, the light rays from the axial object point entering the first lens group G1 of the telephoto lens enter the first incident surface (the surface in the first lens group closest to the object side) parallel to the optical axis even if the light rays are emitted from a close-distance object point.

Hence, if the positive lens element L11 with the convex surface facing the object side in the first lens group G1 is viewed as a set of minute prisms, it needs to have a shape close to minimum deflection angle.

If the positive lens element L11 is structured so that the object side surface of the positive lens element L11 has a convex surface and the image side surface has a mild curvature, then a shape close to the minimum deflection angle is achieved. However, the sign of the radius of curvature of the image side surface can either be positive or negative depending on the aberration structure within the first lens group G1.

The light rays from the axial object point entering positive lens element L11 become convergent light rays. In order to further converge the converging light rays, positive lens element L12 is also a biconvex shape positive lens element that has its surface with the stronger curvature facing the object side to assume the minimum deflection angle.

However, spherical aberration and chromatic aberration become too large if only the two positive lens elements L11 and L12 are incorporated. Therefore, negative lens element L13 is placed immediately towards the image side of positive lens element L12 to perform proper aberration correction.

Moreover, in order to distribute the strong refractive power possessed by the first lens group G1, the rear group G12 containing the positive lens element L14 is placed on the image side of the front lens group G11. The rear group G12 is relatively distant from the front lens group G11 in order to minimize the size of the first lens group G1. The position of rear group G12 with respect to front group G11 is determined by the brightness contributed by the first lens group G1. Accordingly, two positive lens groups of the front lens group G11 and the rear group G12 are able to share the aberration, especially the spherical aberration, generated in the first lens group G1. Moreover, each lens group has strong refractive power and is able to control bow in the spherical aberration generated during correction of the spherical aberration.

Therefore, combined refractive power of the rear group G12 in the first lens group G1, the second lens group G2, and the third lens group G3 is preferably positive.

Moreover, in the rear group G12, a positive lens element L14 is preferably a cemented lens including, in the following order from the object side, a negative meniscus lens with the convex surface facing the object side and a positive meniscus lens with the convex surface facing the object side. This structure helps to obtain even more favorable aberration characteristics, especially with respect to the chromatic correction. The spherical aberration in the first lens group G1 is corrected and at the same time, correction of axial chromatic aberration and chromatic aberration of magnification can be achieved favorably.

Moreover, in the telephoto lens of the present invention, imaging position can be changed by decentering the third lens group G3 with respect to the optical axis. In particular, vibration correction (correction of fluctuation of image position caused by hand shaking) can be performed by installing a focus detection device to detect vibration of the optical system caused by shaking of the hand and the like, a driving device to decenter and drive the third lens group G3 with respect to the optical axis, and an algorithm implementation device to compute and convert output signals from the defocus detection device into signals to decenter and drive the third lens group G3 with respect to the optical axis.

FIG. 1 illustrates the structure of an internal focusing telephoto lens of the first embodiment of the present invention.

The internal focusing lens in the figure includes, in the following order from the object side, first lens group G1, second lens group G2, and third lens group G3. The first lens group includes front lens group G11 including a biconvex lens L11 and a cemented lens that has a biconvex lens L12, and a biconcave lens L13 and a rear group G12 including a cemented positive lens L14 having a negative meniscus lens with a convex surface facing the object side and a biconvex lens. The second lens group G2 includes a biconcave lens L21 and a cemented lens L22 that has a positive meniscus lens with a concave surface facing the object side and a biconcave lens. The third lens group G3 includes an aperture stop S1, a biconvex lens, a negative meniscus lens with a concave surface facing the object side, a positive meniscus lens with a concave surface facing the object side, a field stop S2, a filter, and a field stop S3.

In this embodiment, a filter is provided on the object side of the first lens group G1.

FIG. 1 illustrates the position of each lens group at infinite focus state. Focusing of a close-distance object is performed by moving the second lens group G2 towards the image side. Moreover, fluctuation of the image position caused by shaking and the like of the optical system is corrected by appropriately moving the positive lens group L3. The positive lens group L3 includes a biconvex lens, a negative meniscus lens with the concave surface facing the object side, and a positive meniscus lens with the concave surface facing the object side substantially perpendicular to the optical axis.

Table 1 below summarizes the data values of the first embodiment of the present invention. In Table 1, F is the focal length of the total lens system, $F_{no}$ is the F-number, $\beta$ is a shooting magnification, Bf is back focus, and D0 is a distance from the object to the first lens surface (object distance). Moreover, numerals in the leftmost column represent order of lens surface from the object side, r is the radius of curvature of each lens surface, d is the lens surface interval, and n and ν are respectively the refractive index and Abbe number for the d-line ($\lambda=587.6$ nm).

TABLE 1

F = 294.0
$F_{no}$ = 2.88

| | r | d | ν | n |
|---|---|---|---|---|
| 1 | ∞ | 4.0000 | 64.10 | 1.516800 |
| 2 | ∞ | 0.6000 | | |
| 3 | 173.8655 | 12.0000 | 82.52 | 1.497820 |
| 4 | −978.0647 | 0.2000 | | |
| 5 | 133.6355 | 15.0000 | 82.52 | 1.497820 |
| 6 | −464.6940 | 5.0000 | 46.54 | 1.804109 |
| 7 | 332.9179 | 46.3000 | | |
| 8 | 99.5535 | 3.5000 | 45.00 | 1.744000 |
| 9 | 55.6310 | 15.9000 | 82.52 | 1.497820 |
| 10 | −1371.0602 | (d10 = variable) | | |
| 11 | −169.9686 | 2.7000 | 64.10 | 1.516800 |
| 12 | 67.2847 | 4.5100 | | |
| 13 | −192.9273 | 7.0000 | 33.89 | 1.803840 |
| 14 | −43.0810 | 2.8000 | 61.09 | 1.589130 |
| 15 | 83.8867 | (d15 = variable) | | |
| 16 | ∞ | 1.7000 | | |
| 17 | 194.0386 | 5.8000 | 69.98 | 1.518601 |
| 18 | −90.9579 | 3.1000 | | |
| 19 | −43.5951 | 3.5000 | 28.56 | 1.795040 |
| 20 | −64.7897 | 7.6000 | | |
| 21 | −175.8037 | 6.7000 | 70.41 | 1.487490 |
| 22 | −53.0350 | 14.5000 | | |
| 23 | ∞ | 7.0000 | | |
| 24 | ∞ | 2.0000 | 64.10 | 1.516800 |
| 25 | ∞ | 10.0000 | | |
| 26 | ∞ | Bf | | |

(Variable Interval Upon Focusing)

| | Infinity | Closest Distance |
|---|---|---|
| F, β | 294.0000 | −0.1413 |
| D0 | ∞ | 2195.6253 |
| d10 | 29.5505 | 40.3744 |
| d15 | 19.2807 | 8.4568 |
| Bf | 74.1335 | 74.1335 |

(Condition Corresponding Values)

| | |
|---|---|
| (1) | $|f1 \times f3/(f2 \times F)| = 1.0$ |
| (2) | $|f2|/f1 = 0.38$ |
| (3) | $f11/f12 = 0.81$ |
| (4) | $\nu a = 46.5$ |
| (5) | $(Rb - Ra)/(Rb + Ra) = 0.0$ |
| (6) | $f1/F = 0.510$ |
| (7) | $f22/f21 = 1.728$ |
| (8) | $(Rd + Rc)/(Rd - Rc) = -0.433$ |
| (9) | $\nu b = 64.1$ |
| (10) | $Nc - Nd = 0.21$ |
| (11) | $\nu d - \nu c = 27.2$ |
| (12) | $\Phi/f1 = 0.680$ |

| Vibration Correction Data | Infinite Focusing State | Close-Distance Focusing State |
|---|---|---|
| Displacement amount of the lens group L3 | 1.0 mm (maximum) | 1.0 mm (maximum) |
| Movement amount of corresponding image | +1.0 mm (maximum) | +1.0 mm (maximum) |

Note that the positive sign of the image movement amount indicates that the image moves in the same direction as the displacement direction of the lens group L3, which is the vibration correction lens group.

In the present embodiment, the effective diameter Φ2 of the second lens group G2, which is the focusing lens group, is 43.4. This effective diameter 42 is adequately small.

Moreover, the movement amount of the second lens group G2 during focusing from infinity (R=∞) to the closest distance (R=2500) where R indicates the distance from the object to the image surface is 10.82. Thus the movement amount during focusing is sufficiently small.

Also in the present embodiment, the rear group G12 of the first lens group G1, the second lens group G2, and the third lens group G3 possess a positive combined refractive power.

Figure 2D:
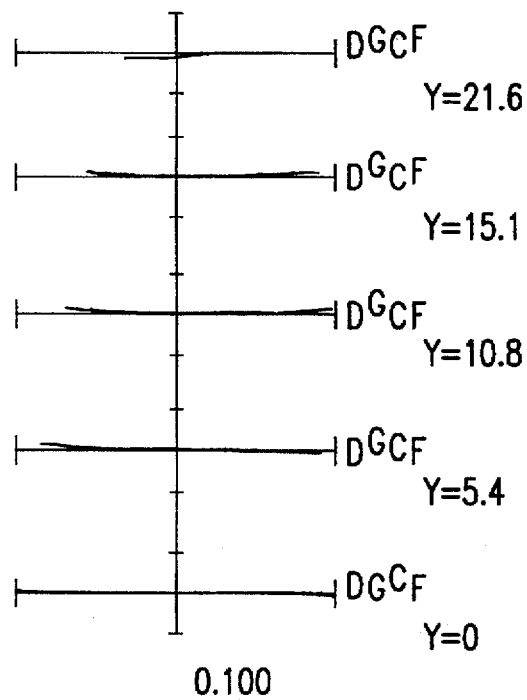
Figure 2E:
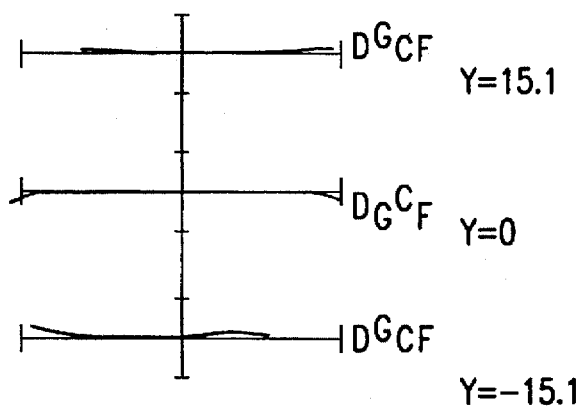
Figure 2F:
Figure 3D:
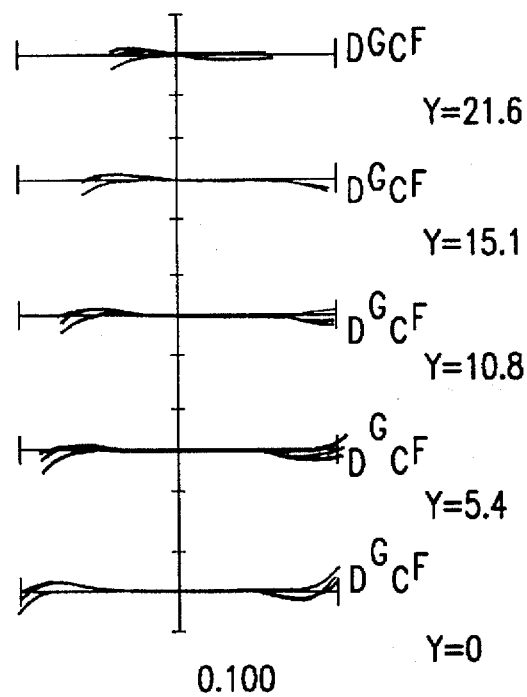
Figure 3E:
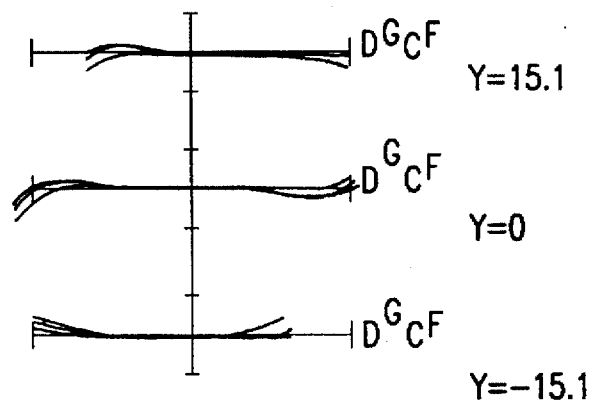
Figure 3F:

FIGS. 2 and 3 are graphs showing various aberrations in the infinite focusing state and the close-distance (R=2500) focusing state. In these graphs, Y is the image height, NA represents aperture numbers, D is the d-line ($\lambda$=587.6 nm), C is the C-line ($\lambda$=656.3 nm), F is the F-line ($\lambda$=486.1 nm), and G is the g-line ($\lambda$=435.6 nm).

Furthermore, in each of graphs 2(b) and 3(b) showing astigmatism, a solid curve represents the sagittal image plane, and a broken curve represents the meridional image plane. Also, in each of graphs 2(a) and 3(a) showing spherical aberration, the broken line represents the sine condition and each graph, 2(f) and 3(f), showing chromatic aberration of magnification is presented with reference to the d-line.

Furthermore, each of graphs 2(e) and 3(e) showing transverse aberration under vibration correction corresponds to the result obtained when the displacement amount of the lens group L3, which is the vibration correction lens group is maximum, i.e., 1 mm.

As can be seen from these graphs, in this embodiment, various aberrations are satisfactorily corrected from the infinite focusing state to the close distance focusing state including those under vibration correction.

FIGS. 2(c) and 3(c) represent distortion and FIGS. 2(d) and 3(d) represent transverse aberration without vibration correction.

FIG. 4 shows the structure of an internal focusing telephoto lens of a second embodiment of the present invention.

The internal focusing lens in the figure includes, in the following order from the object side: first lens group G1; second lens group G2; and third lens group G3. The first lens group G1 includes front lens group G11 that includes a biconvex lens L11 and a biconcave lens L13 and the rear group G12 having a cemented positive lens L14 that includes a negative meniscus lens with a convex surface facing the object side and a positive meniscus lens with a convex surface facing the object side. The second lens group G2 includes a biconcave lens L21 and a cemented negative lens L22 that has a positive meniscus lens with a concave surface facing the object side and a biconcave lens. The third lens group G3 includes an aperture stop S1, a biconvex lens, a negative meniscus lens with a concave surface facing the object side, a positive meniscus lens with a concave surface facing the object side, a field stop S2, a filter, and a field stop S3.

Furthermore, in this embodiment, a filter is provided on the object side of the first lens group G1.

FIG. 4 shows the position of each lens group at infinite focus state. Focusing of a close-distance object is performed by moving the second lens group G2 towards the image side. Moreover, fluctuation of the image position caused by shaking and the like of the optical system is corrected by appropriately moving the positive lens group L3 substantially perpendicular to the optical axis.

Table 2 below summarizes the data values of the second embodiment of the present invention. In Table 2, F is the focal length of the total lens system, $F_{no}$ is the F-number, $\beta$ is a shooting magnification, Bf is back focus, and D0 is a distance from the object to the first lens surface (object distance). Moreover, numerals in the leftmost column represent the order of lens surfaces from the object side, r is the radius of curvature of each lens surface, d is the lens surface interval, n and ν are respectively the refractive index and Abbe number for the d-line ($\lambda$=587.6 nm).

TABLE 2

| F = 490.0 |
| $F_{no}$ = 4.08 |

|   | r | d | ν | n |
|---|---|---|---|---|
| 1 | ∞ | 4.0000 | 64.10 | 1.516800 |
| 2 | ∞ | 1.0000 | | |
| 3 | 187.7545 | 15.2000 | 82.52 | 1.497820 |
| 4 | −1311.4956 | 1.8000 | | |
| 5 | 212.8668 | 14.2000 | 82.52 | 1.497820 |
| 6 | −652.4568 | 1.7000 | | |
| 7 | −612.9315 | 5.9000 | 44.69 | 1.802180 |
| 8 | 363.4033 | 102.8000 | | |
| 9 | 103.6178 | 4.9000 | 50.84 | 1.658440 |
| 10 | 58.0220 | 15.3000 | 82.52 | 1.497820 |
| 11 | 559.6899 | (d11 = variable) | | |
| 12 | −4667.8195 | 3.0000 | 49.45 | 1.772789 |
| 13 | 104.0183 | 3.5400 | | |
| 14 | −158.2754 | 4.8000 | 23.82 | 1.846660 |
| 15 | −68.3360 | 3.0000 | 69.98 | 1.518601 |
| 16 | 94.7970 | (d16 = variable) | | |
| 17 | ∞ | 2.0000 | | |
| 18 | 215.0650 | 5.4000 | 69.98 | 1.518601 |
| 19 | −110.5814 | 1.4790 | | |
| 20 | −67.4745 | 3.5000 | 39.61 | 1.804540 |
| 21 | −192.3170 | 7.4000 | | |
| 22 | −5088.9661 | 5.9000 | 69.98 | 1.518601 |
| 23 | −75.9168 | 40.4000 | | |
| 24 | ∞ | 5.0000 | | |
| 25 | ∞ | 2.0000 | 64.10 | 1.516800 |
| 26 | ∞ | Bf | | |

(Variable Interval Upon Focusing)

|   | Infinity | Closest Distance |
|---|---|---|
| F, β | 580.4190 | −0.1107 |
| D0 | ∞ | 4572.8815 |
| d11 | 39.9396 | 50.7759 |
| d16 | 19.2602 | 18.4240 |
| Bf | 113.7034 | 113.7034 |

(Condition Corresponding Values)

| (1) | $|f1 \times f3/(f2 \times F)|$ = 1.0 |
| (2) | $|f2|/f1$ = 0.33 |
| (3) | f11/f12 = 0.99 |
| (4) | νa = 44.7 |
| (5) | (Rb − Ra)/(Rb + Ra) = −0.031 |
| (6) | f1/F = 0.447 |
| (7) | f22/f21 = 1.259 |
| (8) | (Rd + Rc)/(Rd − Rc) = −0.956 |
| (9) | νb = 49.5 |
| (10) | Nc − Nd = 0.33 |
| (11) | νd − νc = 46.2 |
| (12) | Φ/f1 = 0.562 |

(Vibration Correction Data)

|   | Infinite Focusing State | Close-Distance Focusing State |
|---|---|---|
| Displacement amount of the lens group L3 | 1.74 mm (maximum) | 1.74 mm (maximum) |
| Movement amount of corresponding image | +1.74 mm (maximum) | +1.74 mm (maximum) |

Note that the positive sign of the image movement amount indicates that the image moves in the same direction as the displacement direction of the lens group L3, which is the vibration correction lens group.

Here, in the present embodiment, the effective diameter Φ2 of the second lens group G2, which is the focusing lens group is 42.3. This value shows that the effective diameter Φ2 is sufficiently small to satisfy the specified condition.

Moreover, the movement amount of the second lens group G2 during focusing from infinity (R=∞) to the closest distance (R=5000), where R indicates the distance from the object to the image surface is 10.84. Therefore, the movement amount of focusing is sufficiently small.

FIGS. 5 and 6 are graphs showing various aberrations in the infinite focusing state and the closest-distance (R=5000) focusing state. In these graphs, Y is the image height, NA is aperture numbers, D is the d-line (λ=587.6 nm), C is the C-line (λ=656.3 nm), F is the F-line (λ=486.1 nm), and G is the g-line (λ=435.6 nm).

Figure 5C:
FIGS. 5(a)–5(f) show various aberrations in an infinite focusing state in the second embodiment of FIG. 4.
Figure 5B:
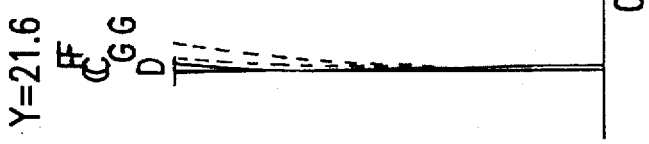
Figure 5A:
Figure 6C:
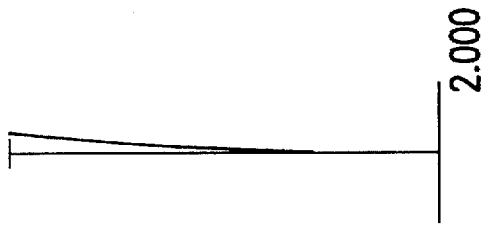
FIGS. 6(a)–6(f) show various aberrations in a close distance focusing state in the second embodiment of FIG. 4.
Figure 6B:
Figure 6A:
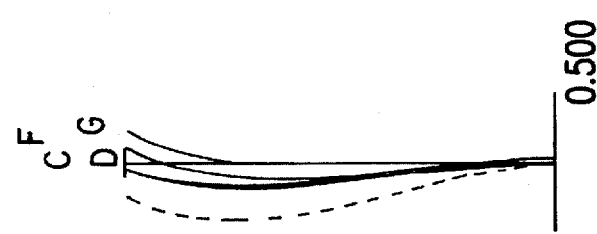

Furthermore, in each graph of FIGS. 5(b) and 6(b) showing astigmatism, a solid curve represents the sagittal image plane, and a broken curve represents the meridional image plane. Also, in each graph of FIGS. 5(a) and 6(a) showing spherical aberration, the broken line represents sine condition and each of graphs 5(f) and 6(f) showing chromatic aberration of magnification is presented with reference to the d-line.

Furthermore, each of graphs 5(e) and 6(e) showing transverse aberration under vibration correction corresponds to the result obtained when the displacement amount of the lens group L3, which is the vibration correction lens group, is maximum, i.e., 1.74 mm.

Figure 5D:
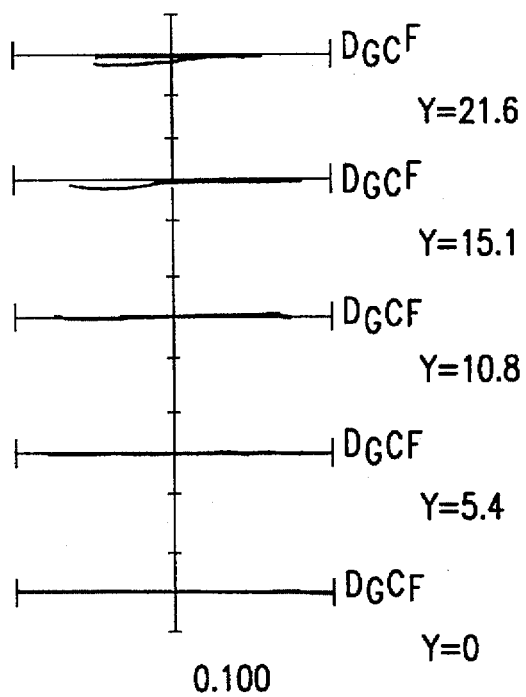
Figure 5E:
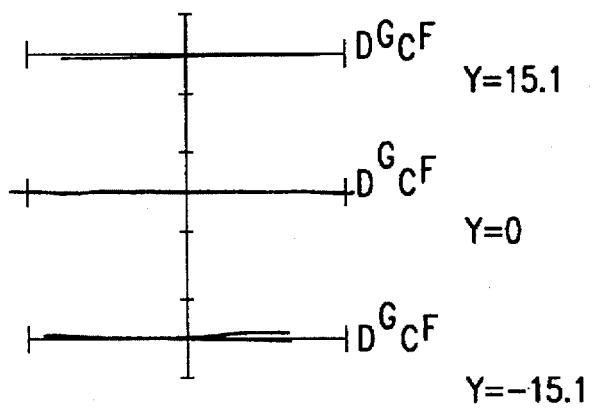
Figure 5F:
Figure 6D:
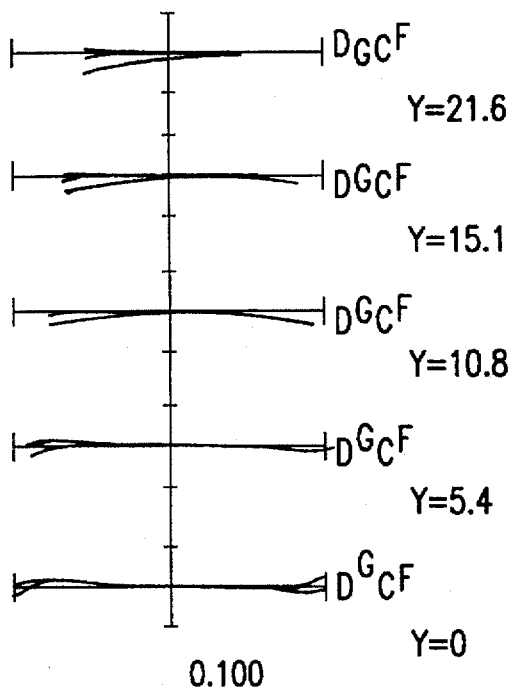
Figure 6E:
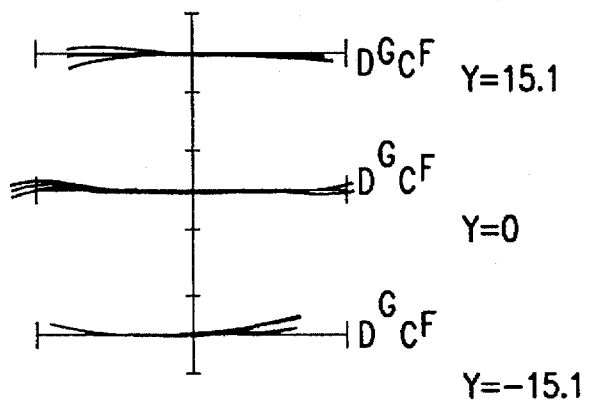
Figure 6F:

FIGS. 5(c) and 6(c) represent distortion and FIGS. 5(d) and 6(d) represent transverse aberration without vibration correction.

As can be seen from these graphs, in this embodiment, various aberrations are satisfactorily corrected from the infinite focusing state to the close-distance focusing state including those under vibration correction.

FIG. 7 shows the structure of an internal focusing telephoto lens of a third embodiment of the present invention.

The internal focusing lens in the figure comprises, in the following order from the object side, first lens group G1, second lens group G2, and third lens group G3. The first lens group includes front lens group G11 including a biconvex lens L11, a biconvex lens L12, and a biconcave lens L13 and rear group G12 including a cemented positive lens L14 having a negative meniscus lens with a convex surface facing the object side and a positive meniscus lens with a convex surface facing the object side. The second lens group G2 includes a negative meniscus lens L21 with the convex surface facing the object side and a cemented negative lens L22 having a positive meniscus lens with the concave surface facing the object side. The third lens group G3 includes a cemented positive lens having two biconvex lenses, a negative meniscus lens with the concave surface facing the object side, an aperture stop S1, a field stop S2, a filter, and a field stop S3.

In this embodiment, a filter is provided on the object side of the first lens group G1.

FIG. 7 illustrates the position of each lens group at infinite focus state and focusing of close-distance objects is performed by moving the second lens group G2 towards the image side. Moreover, the cemented positive lens having a biconvex lens and a negative meniscus lens with the concave surface facing the object side in the third lens group G3 compose the positive lens group L3.

Table 3 below summarizes the data values of the third embodiment of the present invention. In Table 3, F is the focal length of the total lens system, $F_{no}$ is the F-number, β is a shooting magnification, Bf is back focus, and D0 is a distance from the object to the first lens surface (object distance). Moreover, numerals in the leftmost column represent order of lens surface from the object side, r is the radius of curvature of each lens surface, d is the lens surface interval, n and ν are respectively the refractive index and Abbe number for the d-line (λ=587.6 nm).

TABLE 3

F = 588.0
$F_{no}$ = 4.08

| | r | d | ν | n |
|---|---|---|---|---|
| 1 | ∞ | 5.0000 | 64.10 | 1.516800 |
| 2 | ∞ | 1.2000 | | |
| 3 | 247.1840 | 18.3000 | 82.52 | 1.497820 |
| 4 | −702.0300 | 0.2000 | | |
| 5 | 217.5550 | 19.8000 | 82.52 | 1.497820 |
| 6 | −491.8080 | 2.5000 | | |
| 7 | −463.4330 | 6.5000 | 46.54 | 1.804109 |
| 8 | 388.4650 | 154.5000 | | |
| 9 | 104.6500 | 5.5000 | 46.54 | 1.804109 |
| 10 | 68.0010 | 14.9000 | 82.52 | 1.497820 |
| 11 | 7079.0000 | (d11 = variable) | | |
| 12 | 524.9600 | 2.8000 | 47.47 | 1.787971 |
| 13 | 93.8160 | 3.4000 | | |
| 14 | −284.1590 | 5.7000 | 25.41 | 1.805182 |
| 15 | −64.0190 | 2.8000 | 60.03 | 1.640000 |
| 16 | 86.5580 | (d16 = variable) | | |
| 17 | 112.2050 | 7.0000 | 69.98 | 1.518601 |
| 18 | −83.7130 | 3.5000 | 33.89 | 1.803840 |
| 19 | −160.7740 | 2.7000 | | |
| 20 | ∞ | 36.5000 | | |
| 21 | ∞ | 2.0000 | | |
| 22 | ∞ | 2.0000 | 64.10 | 1.516800 |
| 23 | ∞ | Bf | | |

(Variable Interval Upon Focusing)

| | Infinity | Closest Distance |
|---|---|---|
| F, β | 579.3529 | −0.1082 |
| D0 | ∞ | 5537.4340 |
| d11 | 33.4177 | 44.2811 |
| d16 | 16.5738 | 5.7105 |
| Bf | 115.6862 | 115.6862 |

(Condition Corresponding Values)

| (1) | |f1 × f3/(f2 × F)| = 1.0 |
|---|---|
| (2) | |f2|/f1 = 0.28 |
| (3) | f11/f12 = 1.30 |
| (4) | νa = 46.5 |
| (5) | (Rb − Ra)/(Rb + Ra) = −0.030 |
| (6) | f1/F = 0.419 |
| (7) | f22/f21 = 0.894 |
| (8) | (Rd + Rc)/(Rd − Rc) = −1.435 |
| (9) | νb = 47.5 |
| (10) | Nc − Nd = 0.17 |
| (11) | νd − νc = 34.6 |
| (12) | Φ/f1 = 0.593 |

(Vibration Correction Data)

In the present embodiment, the effective diameter Φ2 of the second lens group G2, which is the focusing lens group, is 38.8. Therefore, the effective diameter Φ2 is sufficiently small.

Moreover, the moving amount of the second lens group G2 during focusing from infinity (R=∞) to the closest distance (R=6000), where R indicates the distance from the object to the image surface is 10.86. Therefore, the focusing movement amount is sufficiently small.

Figure 8D:
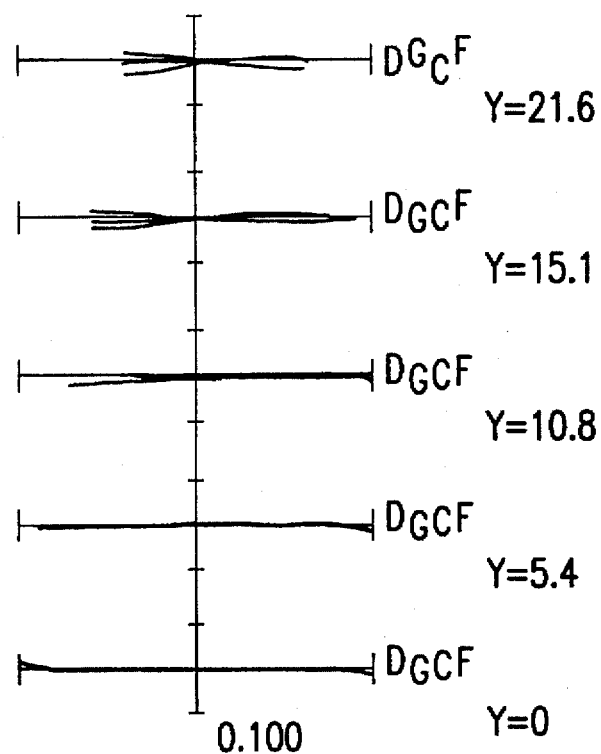
Figure 8E:
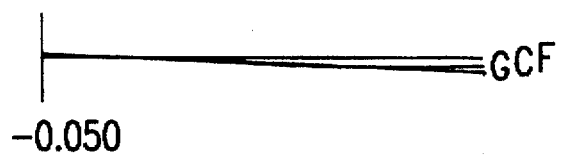

FIGS. 8 and FIG. 9 are graphs showing various aberrations in the infinite focusing state and the closest-distance (R=6000) focusing state. In these graphs, Y is the image height, NA is aperture numbers, D is the d-line (λ=587.6 nm), C is the C-line (λ=656.3 nm), F is the F-line (λ=486.1 nm), and G is the g-line (λ=435.6 nm).

Furthermore, in each of graphs 8(b) and 9(b) showing astigmatism, a solid curve represents the sagittal image plane and a broken curve represents the meridional image plane. Also, in each of graphs 8(a) and 9(a) showing spherical aberration, the broken line represents sine condition and each of graphs 8(e) and 9(e) showing chromatic aberration of magnification is presented with reference to the d-line.

Figure 9C:
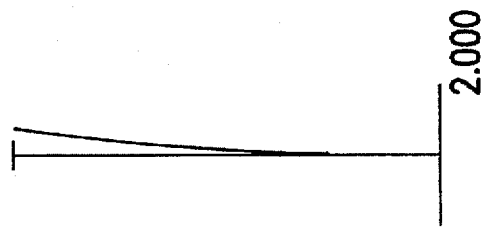
FIGS. 9(a)–9(e) show various aberrations in a close distance focusing state in the third embodiment of FIG. 7.
Figure 9B:
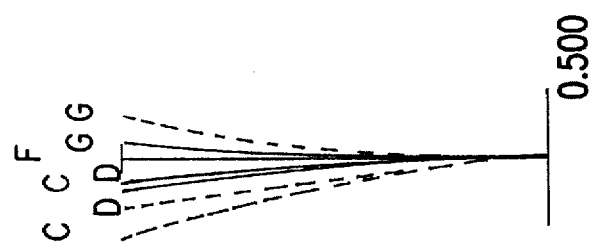
Figure 9A:
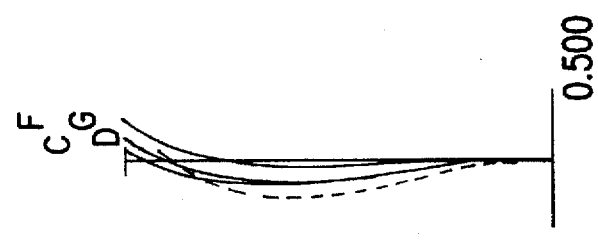
Figure 9D:
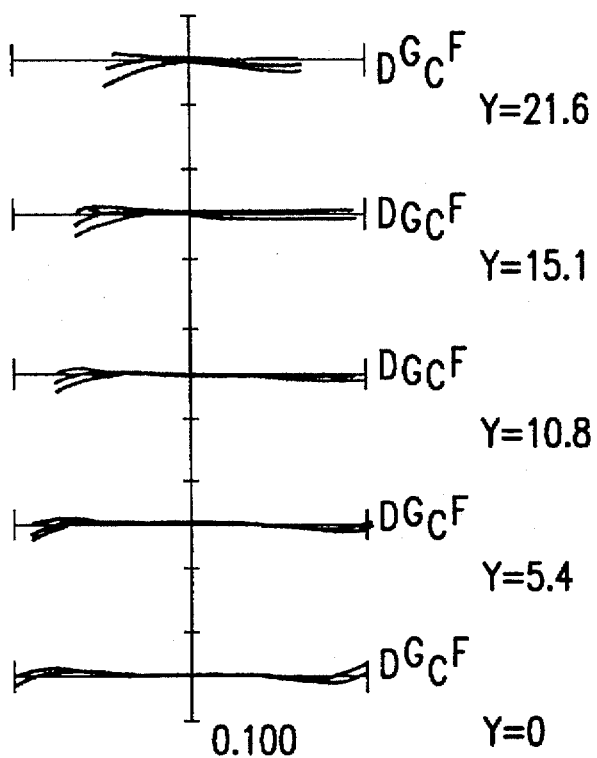
Figure 9E:

FIGS. 8(c) and 9(c) represent distortion and FIGS. 8(d) and 9(d) represent transverse aberration without vibration correction.

As can be seen from these graphs, in this embodiment, various aberrations are satisfactorily corrected from the infinite focusing state to the closest-distance focusing state, including those under vibration correction.

As described above, the internal focusing telephoto lens of the present invention is capable of maintaining favorable imaging performance from the infinite focusing state to the closest-distance focusing while holding the effective diameter $\Phi$ of the lens and the focusing movement amount small.

Moreover, as described in the first and the second embodiments, the internal focusing telephoto lens of the invention is capable of maintaining favorable imaging performance from the infinite focusing state to the closest-distance focusing state during the vibration correction, by decentering the positive lens group L3 in the third lens group G3 with respect to the optical axis.

While this invention has been described in conjunction with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. An internal focusing telephoto lens having a plurality of lens groups arranged along an optical axis from an object side to an image side to form a total lens system, the telephoto lens comprising:

a first lens group with positive refractive power, said first lens group comprising a front group with positive refractive power and a rear group with positive refractive power;

a second lens group with negative refractive power positioned on the image side of the first lens group; and a third lens group with positive refractive power positioned on the image side of the second lens group, wherein said first lens group and said second lens group form a substantially afocal system and focusing is performed by moving said second lens group along the optical axis, and wherein the condition $0.7 < f11/f12 < 1.4$ is satisfied, where f11 is a focal length of the front group and f12 is a focal length of the rear group.

2. The internal focusing telephoto lens according to claim 2, wherein the following conditions:

$$0.7 < |f1 \times f3/(f2 \times F)| < 1.3$$

$$0.24 < |f2|/f1 < 0.41$$

are satisfied, where f1 is a focal length of the first lens group, f2 is a focal length of the second lens group, f3 is a focal length of the third lens group, and F is a focal length of the total lens system.

3. The internal focusing telephoto lens according to claim 1, wherein the front lens group comprises, a first positive lens element, a second positive lens element on the image side of the first positive lens element, and a negative lens element on the image side of the second positive lens element and conditions $$va < 48$$

$$-0.46 < (Rb-Ra)/(Rb+Ra) \leq 0$$

are satisfied where Ra is a radius of curvature of an image side surface of said second positive lens element, Rb is a radius of curvature of an object side surface of the negative lens element and va is an Abbe number of said negative lens element.

4. The internal focusing telephoto lens according to claim 1, wherein the second lens group comprises, a first negative lens element and a second negative lens element on the image side of said the first negative lens element, the third lens group comprises a positive lens group, and conditions, $$0.35 < f1/F < 0.60$$
$$0.7 < f22/f21 < 1.8$$
$$-1.4 < (Rd + Rc)/(Rd - Rc) < -0.4$$

are satisfied, where f1 is a focal length of the first lens group, F is a focal length of the total lens system, f21 is a focal length of the first negative lens element, f22 is a focal length of the second negative lens element, Rc is a radius of curvature of an object side surface of the first negative lens element, and Rd is a radius of curvature of an image side surface of the first negative lens element.

5. The internal focusing telephoto lens according to claim 4, wherein the first negative lens element of the second lens group comprises one piece of negative lens.

6. The internal focusing telephoto lens according to claim 1, wherein a condition, $$45 < vb$$

is satisfied, where vb is an Abbe number of the first negative lens element of the second lens group.

7. The internal focusing telephoto lens according claim 4, wherein said second negative lens element of the second lens group comprises a cemented lens, which comprises a positive meniscus lens with a concave surface facing the object side and a biconcave lens on the image side of the positive meniscus lens, and conditions $$0.1 < Nc-Nd < 0.35$$

$$25 < vd-vc$$

are satisfied where Nc is a refractive index of the positive meniscus lens, vc is an Abbe number of the positive meniscus lens, Nd is a refractive index of the biconcave lens and vd is an Abbe number of the biconcave lens.

8. The internal focusing telephoto lens according to claim 1, wherein a condition, $$0.55 < \Phi/f1 < 0.72$$

is satisfied where f1 is a focal length of the first lens group, $\Phi$ is an effective diameter of an object side lens surface of the first positive lens element in the first lens group positioned closest to the object side.

9. The internal focusing telephoto lens according to of claim 1, wherein the rear group in the first lens group comprises a cemented lens comprising, a negative meniscus lens with a convex surface facing the object side and a positive meniscus lens on the image side of the negative meniscus lens with a convex surface facing the object side.

10. The internal focusing telephoto lens according to claim 1, wherein the rear group in the first lens group, the second lens group, and third lens group have positive combined refractive power.

11. The internal focusing telephoto lens according to claim 1, wherein change in image position is corrected by decentering the third lens group with respect to the optical axis.

12. The internal focusing telephoto lens according to claim 1, wherein the following condition:

$$0.8 < f11/f12 < 1.3$$

is satisfied, where f11 is a focal length of the front lens group and f12 is a focal length of the rear lens group.

13. The internal focusing telephoto lens according to claim 1, wherein the front lens group comprises, a first positive lens element, a second positive lens element, and a negative lens element on the image side of the second positive lens element and conditions:

$$va < 48$$
$$-0.1 < (Rb-Ra)/(Rb+Ra) \leq 0$$

are satisfied, where Ra is a radius curvature of an image side surface of said positive lens element, Rb is a radius of curvature of an object side surface of the negative lens element and va is an Abbe number of said negative lens element.

14. An internal focusing telephoto lens having a plurality of lenses arranged along an optical axis from an object side to an image side to form a total lens system, the telephoto lens comprising:

converging means for receiving light rays from an object, the converging means having positive refractive power and comprising a front group with positive refractive power and a rear group with positive refractive power;

focusing means for focusing on the object by moving a small distance along the optical axis, the focusing means having negative refractive power and positioned on the image side of the converging means; and image stabilization means for stabilizing an image by moving a small distance in a direction perpendicular to the optical axis, the image stabilizing means having positive refractive power and positioned on the image side of the focusing means, wherein the converging means and the focusing means form a substantially afocal system, and wherein the condition 0.7<f11/f12<1.4 is satisfied, where f11 is a focal length of the front group and f12 is a focal length of the rear group.

15. The internal focusing telephoto lens according to claim 14, wherein the following conditions:

$$0.7 < |f1 \times f3/(f2 \times F)| < 1.3$$
$$0.24 < |f2|/f1 < 0.41$$

are satisfied, where f1 is a focal length of the converging means, f2 is a focal length of the focusing means, f3 is a focal length of the image stabilizing means, and F is a focal length of the total lens system.

16. The internal focusing telephoto lens according to claim 14, wherein the front lens group comprises, a first positive lens element, a second positive lens element on the image side of the first positive lens element, and a negative lens element on the image side of the second positive lens element and conditions $$va < 48$$
$$-0.46 < (Rb-Ra)/(Rb+Ra) \leq 0$$

are satisfied where Ra is a radius of curvature of an image side surface of said second positive lens element, Rb is a radius of curvature of an object side surface of the negative lens element and va is an Abbe number of said negative lens element.

17. The internal focusing telephoto lens according to claim 14, wherein the focusing means comprises, a first negative lens element and a second negative lens element on the image side of said the first negative lens element, the image stabilizing means comprises a positive lens group, and the conditions, $$0.35 < f1/F < 0.60$$
$$0.7 < f22/f21 < 1.8$$
$$-1.4 < (Rd + Rc)/(Rd - Rc) < -0.4$$

are satisfied, where f1 is a focal length of the converging means, F is a focal length of the total lens system, f21 is a focal length of the first negative lens element, f22 is a focal length of the second negative lens element, Rc is a radius of curvature of an object side surface of the first negative lens element, and Rd is a radius of curvature of an image side surface of the first negative lens element.

18. The internal focusing telephoto lens according to claim 17, wherein the first negative lens element of the focusing means comprises one piece of negative lens.

19. The internal focusing telephoto lens according to claim 14, wherein a condition, $$45 < vb$$

is satisfied, where vb is an Abbe number of the first negative lens element of the second lens group.

20. The internal focusing telephoto lens according claim 17, wherein said second negative lens element of the second lens group comprises a cemented lens which comprises a positive meniscus lens with a concave surface facing the object side and a biconcave lens on the image side of the positive meniscus lens and conditions $$0.1 < Nc - Nd < 0.35$$
$$25 < vd - vc$$

are satisfied where Nc is a refractive index of the positive meniscus lens, vc is an Abbe number of the positive meniscus lens, Nd is a refractive index of the biconcave lens and vd is an Abbe number of the biconcave lens.

21. The internal focusing telephoto lens according to claim 14, wherein a condition, $$0.55 < \Phi/f1 < 0.72$$

is satisfied where f1 is the focal length of the converging means, Φ is an effective diameter of the object side lens surface of the first positive lens element in the converging means positioned closest to the object side.

22. The internal focusing telephoto lens according to of claim 14, wherein the rear group in the converging means comprises a cemented lens comprising, a negative meniscus lens with a convex surface facing the object side and a positive meniscus lens on the image side of the negative meniscus lens with a convex surface facing the object side.

23. The internal focusing telephoto lens according to claim 14, wherein the rear group in the converging means, the focusing means, and image stabilizing means have positive combined refractive power.

24. The internal focusing telephoto lens according to claim 14, wherein the following condition:

$$0.8 < f11/f12 < 1.3$$

is satisfied, where f11 is a focal length of the front lens group and f12 is a focal length of the rear lens group.

25. The internal focusing telephoto lens according to claim 14, wherein the front lens group comprises, a first positive lens element, a second positive lens element on the image side of the first positive lens element, and a negative lens element on the image side of the second positive lens element and conditions:

$$\nu a < 48$$

$$-0.1 < (Rb-Ra)/(Rb+Ra) \leq 0$$

are satisfied, where Ra is a radius curvature of an image side surface of said positive lens element, Rb is a radius of curvature of an object side surface of the negative lens element and νa is an Abbe number of said negative lens element.

* * * * *